INVENTORS.
JOHN W. BAUM
BY  PETER S. LITTLEFIELD

United States Patent Office

3,531,639
Patented Sept. 29, 1970

3,531,639
PRESSURIZED GAS MONITOR FOR LOW LEVEL RADIOACTIVE GASES
John W. Baum, Patchogue, N.Y., and Peter S. Littlefield, Rockland, Mass., assignors to the United States of America as represented by the United States Atomic Energy Commission
Filed Dec. 10, 1968, Ser. No. 782,563
Int. Cl. G01n 23/12; G01t 1/20
U.S. Cl. 250—43.5       1 Claim

ABSTRACT OF THE DISCLOSURE

A monitor for continuously measuring low concentrations of radioactive gases. A pressure vessel contains a labyrinth formed by scintillating material. A photomultiplier tube adjacent a window in the pressure vessel measures the light emitted by the scintillating material.

BACKGROUND OF THE INVENTION

The invention described herein was made in the course of, or under a contract with the United States Atomic Energy Commission.

The growth, in size and numbers, of power generating nuclear reactors brings about an increased interest in the monitoring of low concentrations of radioactive gases, both in the vicinity of these reactors and of the associated nuclear fuel reprocessing facilities. For example, a 3,000 mw. ($t$) reactor contains approximately $10^9$ curies of fission product noble gases. The routine discharge of only a small fraction of these as waste could result in unacceptable doses to the population in the vicinity of such a facility. While storage for brief periods may be utilized to reduce the concentration of the short-lived isotopes in some situations, this is not practicable for the large volumes of waste gases produced by air-cooled and boiling-water reactors containing large amounts of 10-year $^{85}$Kr.

Up to the present the number and size of nuclear of nuclear power reactors have been such that the discharge of these radioactive effluents in the region surrounding the reactor could be tolerated. With increasing number and size of reactors now being considered or in the planning stage it is becoming essential to find out more accurately what happens to this effluent once leaving the reactor and before being completely dispersed. As a result, there is increasing activity by meteorologists and others in studying the distribution of reactor effluent in the regions surrounding the reactor. Methods have been developed for predicting the ground level dose rate from a stack effluent of noble gases, and devices such as ion chambers and thermoluminescent dosimeters are utilized to verify experimentally these predictions. However, because the dose rates are very low, these measurements are subject to relatively large errors.

Furthermore, although a knowledge of ground level dose rates of stack effluent gases is important for the reason suggested above, methods for the prediction and measurement of their ground level concentrations are also of great interest since these concentrations are the controlling consideration for the release of most other types (radioactive or otherwise) of stack effluents. As their permissible ground level concentrations are relatively large, the radioactive gases would seem to be desirable tracers for stack effluent dispersion studies. Many generally available devices, e.g., ionization chambers, GM tubes, and scintillators, are suitable for monitoring the concentrations of radioactive gases acceptable at the point of discharge from a stack. However, none are sensitive much below $1 \times 10^{-7}$ $\mu$Ci./cm.$^3$ so they are of limited value for the ground level environmental situations in which much lower concentrations are encountered.

Efforts to date to obtain adequate low level measurements have included the sampling of $^{41}$Ar by passing air through a charcoal cartridge at cryogenic temperatures for a period of time and subsequently counting the cartridge by gamma spectrometry, but this method is not suitable for continuous monitoring. Another method involves the pumping of air to be sampled through sheets of scintillator material at atmospheric pressure and integrating the results over six minute intervals. This method does not appear to give adequate information on ground-level concentrations.

SUMMARY OF THE INVENTION

The present invention relates to a device capable of continuously measuring noble gases such as $^{41}$Ar in concentration substantially lower than heretofore has been possible.

In accordance with this invention, a preferred embodiment of such a monitor consists of a steel pressure vessel housing a plastic scintillation tank containing baffles of plastic scintillator. Compressed air containing the gas to be measured is passed between the baffles and the resulting beta scintillations are counted by a photomultiplier tube and conventional apparatus. The use of pressures up to and in excess of 1000 p.s.i. makes it possible to obtain a considerable sample concentration within a predictable volume. Using $^{41}$Ar as a tracer, the monitor is employed in conjunction with meteorological instrumentation to investigate the short-term accuracy of atmospheric diffusion equations.

It is thus a principal object of this invention to provide apparatus for monitoring continuously trace amounts of radioactive gases with improved accuracy and dependability.

Other objects and advantages of this invention will become readily apparent from the following description of a preferred embodiment of this invention taken with reference to the accompanying drawing.

DESCRIPTION OF THE PREFERRED EMBODIMENT

Figure 2:
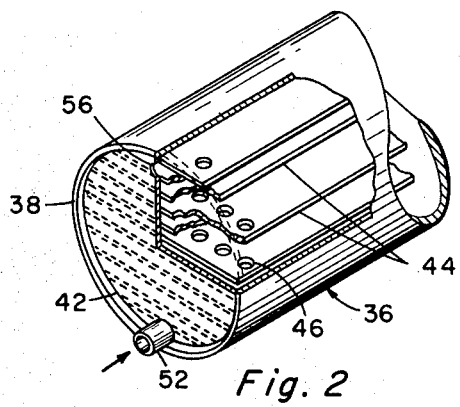
FIG. 2 is a detailed partial view in partial section of the scintillator assembly.
Figure 1:
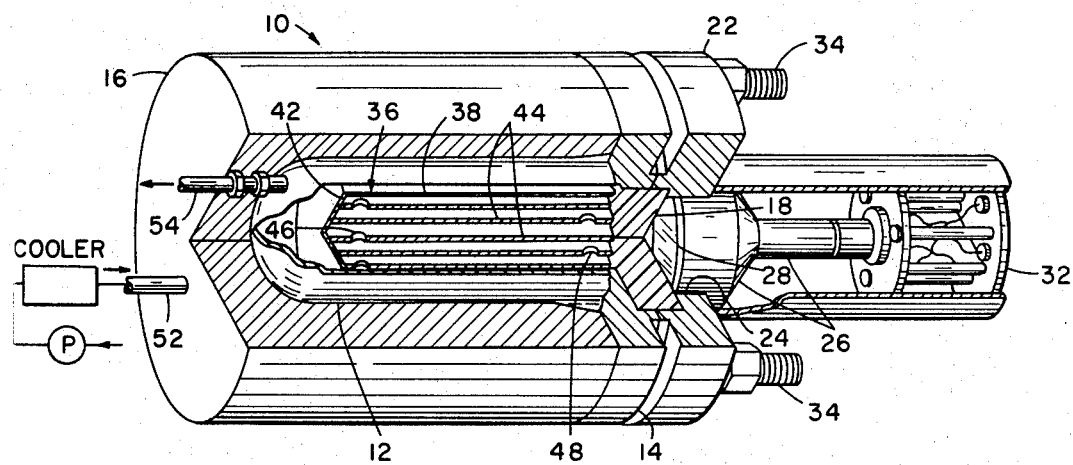
FIG. 1 is an isometric view in partial section of a preferred embodiment of this invention.

Referring to FIGS. 1 and 2, monitor 10 consists of an enclosed cylindrical pressure vessel 12 terminating at one end in a flange 14. Suitable shielding material 16, such as lead, encloses vessel 12 from flange 14 as illustrated. Mounted within flange 14 is a light pipe 18 made from a light transparent plastic material such as polymethylmethacrylate for a purpose to be later described. An outer flange 22 holds light pipe 18 in place and has an opening 24 in which one end of a photomultiplier tube 26 is mounted as shown. It will be seen that the flat sensitive end 28 of tube 26 faces light pipe 18. On the opposite end of tube 26 is suitable preamplification circuitry 32 to provide the output of monitor 10. The assembly as illustrated is held together by a plurality of bolts 34.

Within pressure vessel 12 is mounted a cylindrical scintillator assembly 36 consisting of a cylindrical tube 38 with a pair of end plates such as 42 illustrated and an assembly of spaced sheets 44 mounted is shown within tube 38. At the ends of sheets 44 a series of holes 46 and 48 are located in a staggered array so that gas passing through assembly 36 must pass up and back through a labyrinth. An inlet pipe 52 extends through shielding 16 and the end wall of vessel 12 through end plate 42 into the space below the bottom sheet 44 within assembly 36. The air or gas to be monitored is supplied from a pump P through a cooler as shown to reduce the temperature of the gas heated up by compression. Outlet pipe 54 communicates as shown only with the cavity formed between end plate 42 and the end of pressure vessel 12, so that scintillator assembly 36 is subject to equal gas pressure within and without. An outlet opening 56 in the upper portion of end plate 42 above the top sheet 44 within assembly 36 provides for the exiting gas to be fed into the mentioned cavity. Assembly 36 is located up against light pipe 18 so that photomultiplier tube 26 will sense and detect the scintillations of light produced by assembly 36.

Scintillation sheets 44 are composed as understood in the art of suitable plastic material to produce scintillations as the result of presence of beta particles and transparent to the particular light energy so that the latter can be detected by tube 26. Such materials are well known in the art and are commercially available. The outer walls of assembly 36 may be made from a transparent plastic material, a material capable of carrying light, or the same sensitive material as sheets 44. A suitable silicone grease may be used between window or light pipe 18 and the photo cathode of photomultiplier tube 26 for improved optical coupling.

The thickness of radiation sensitive sheets 44 is not critical but should be thick enough for structural rigidity and to stop a reasonable fraction of the beta energy emitted by the gas but not thicker than necessary, as increased thickness reduces sensitivity and uses up volume which could be occupied by gas. A suitable thickness has been found to be about 1/32 inch.

The spaces between sheets 44 should be as small as possible, but if too small, then many more sheets are required with the cost of the unit becoming too high; while if spacing is too large, too much beta energy is lost in the gas instead of the scintillating material so that the device loses sensitivity.

The length of sheets is not critical but if made too long, too much of the light is lost in the plastic and does not reach the photomultiplier tube while if too short, there is excessive reflection of light back and forth and the diameter of the pressure vessel and the photomultiplier tube becomes excessive.

In the operation of monitor 10 just described, the gases undergoing investigation for beta emission would be cleaned to remove all dust and other particulate and compressed to a suitable high pressure, typically 120 p.s.i.g., and capable of up to 1000 p.s.i.g. For a monitor having a scintillation assembly 12 inches in length and 4.5 inches in diameter, with sheets 44 spaced 3/8 inch apart it has been found that monitor 10 will have a throughput of up to 125 standard cubic feet per minute (at one atmosphere pressure). The gas is cooled to ambient conditions or below to remove the heat generated by compression and passed into monitor 10 by way of inlet pipe 52, passed up and back the labyrinth within assembly 36 and then passed out through opening 56 and outlet pipe 54. Photomultiplier 26 continuously records the scintillation rate which is then recorded or displayed in ways known in the art.

The arrangement just described is capable of producing measurable results of relatively small amounts of beta emitting gases present in the air or other gas being pumped through the device, producing satisfactory results at levels below that which has been heretofore difficult or impossible to accomplish.

The device described is of particular application for measuring the presence of beta radiation. In the event that gamma or alpha radiation is to be measured, it is understood that the relative size, shape, and type of materials would have to be altered to accommodate the differences in penetrability and other characteristics of the radiation.

While only a preferred embodiment has been described it is understood that the invention is capable of many variations without departing from the principles thereof and is therefore defined only by the following claim.

We claim:

1. Apparatus for continuously monitoring low concentrations of radioactive gas comprising
 (a) a pressure vessel;
 (b) means defining a labyrinth within said pressure vessel, said means including a plurality of closely spaced sheets of scintillating material forming said labyrinth, said spaced sheets parallel to each other and each sheet having openings therethrough at one end, said openings being staggered at opposite ends of adjacent sheets, said sheets are arranged within a closed assembly having outer walls with inlet and outlet openings and means within said pressure vessel to maintain the pressure within and without of said assembly at substantially the same pressure and in which the outer walls of said assembly are made from scintillation material;
 (c) a window in said pressure vessel to permit light generated therewith to leave said pressure vessel;
 (d) means outside of said pressure vessel adjacent said window for receiving and measuring the light scintillations generated within said vessel;
 (e) means for pumping in excess of about 1000 p.s.i. pressures a gas containing a radio-active constituent through said pressure vessel to permit relatively low concentrations of radioactive gas to be monitored and measured with acceptable accuracy, said compressed gas passing back and forth along the lengths of said sheets and hence during the whole course of such passage to be within suitable measuring distance from a sheet of scintillating material; and
 (f) means for cooling said gas under pressure to entry into said pressure vessel to withdraw the heat of compression.

References Cited

UNITED STATES PATENTS 3,005,100   10/1961   Thompson   250—43.5 XR
3,202,819   8/1965   Christianson   250—43.5 XR ARCHIE R. BORCHELT, Primary Examiner M. J. FROME, Assistant Examiner U.S. Cl. X.R.

250—71.5